United States Patent [19]

Ozaki et al.

[11] Patent Number: 4,658,654
[45] Date of Patent: Apr. 21, 1987

[54] FLOW RATE DETECTING DEVICE

[75] Inventors: Yukinori Ozaki, Shiki; Shuji Yamanouchi, Nara, both of Japan

[73] Assignee: Matsushita Electric Industrial Co., Ltd., Osaka, Japan

[21] Appl. No.: 761,021

[22] Filed: Jul. 31, 1985

[30] Foreign Application Priority Data

Jul. 31, 1984 [JP] Japan ................. 59-161747
Nov. 20, 1984 [JP] Japan ................. 59-244958
Dec. 11, 1984 [JP] Japan ................. 59-261128

[51] Int. Cl.⁴ .............................................. G01F 1/66
[52] U.S. Cl. ............................. 73/861.05; 73/861.32
[58] Field of Search ................. 73/861.05, 861.32, 255

[56] References Cited

U.S. PATENT DOCUMENTS 3,381,531  5/1968  Arutjunov et al. ............. 73/861.32
3,443,432  5/1969  Shonin et al. .................. 73/861.32
3,861,210  1/1975  Griverus ........................ 73/861.32

FOREIGN PATENT DOCUMENTS 0070152  1/1983  European Pat. Off. ......... 73/861.05
1209547 10/1970  United Kingdom ............... 73/255
 720295  3/1980  U.S.S.R. .

Primary Examiner—Herbert Goldstein
Attorney, Agent, or Firm—Wenderoth, Lind & Ponack

[57] ABSTRACT

A flow rate detecting device which includes a fixed rotating member for converting a fluid from a straightforward flow to a rotary flow, and a spherical member. Frictional force acting on the spherical member can be decreased and the rotary orbital track for the spherical member can be stabilized by the arrangement of a spherical member receiver, by which the spherical member is supported, having a receiving face perpendicular to the fluid flow, and outflow paths at its central and circumferential sides, and as a result, a high performance of the flow rate detecting device can be accomplished.

7 Claims, 20 Drawing Figures

FLOW RATE DETECTING DEVICE

BACKGROUND OF THE INVENTION

The present invention generally relates to a flow rate detecting device for detecting an instantaneous flow rate of a fluid, which is provided, for example, in a water flow passage for a water or hot water supplying apparatus, or in a fuel supplying passage and a combustion air supplying passage for a burning apparatus, and more particularly, to a flow rate for a burning apparatus, and more particularly, to a flow rate detecting device for detecting a flow rate as a mechanical action which is converted into electrical signals.

As one of the conventional flow rate detecting devices, means for detecting the flow rate directly by an electric signal have been constructed, but owing to the large size and high cost, they are generally used as electronic measuring instruments, and in the application to the public welfare appliances, there have often been utilized a means having a mechanical portion to be operated in proportion to the flow rate for detecting the operation by an electric signal.

Figure 1:
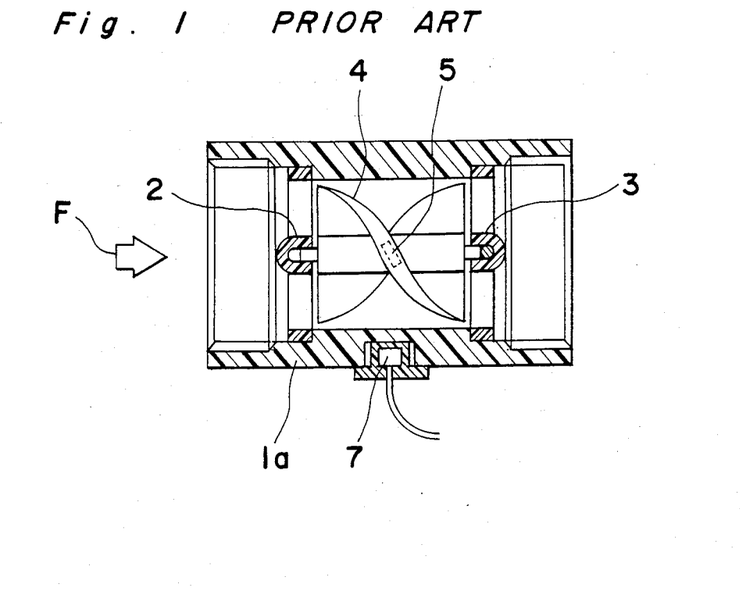
FIGS. 1 and 2 are cross-sectional views of conventional flow rate detecting devices (already referred to)

In the construction illustrated in FIG. 1, the number of revolutions is detected by a permanent magnet 5 buried in a circumferential portion of a rotary blade 4, which is supported by an upstream side bearing 2 and a downstream side bearing 3 in a flow passage F, and a magnetic sensor 7 fitted on a fixed housing 1a.

Accordingly, the magnetic sensor 7 emits pulses proportional in number to the flow rate, since the rotary blade 4 is rotated in proportion to the flow rate.

In such a construction as mentioned above, it is apprehended that the the number of revolutions for a given flow rate may be reduced by fine sand particles or dust contained in a fluid, which has a possibility to enter the bearings 2 and 3 undesirably, on account of said bearings 2 and 3 being provided in the flow passage F, and it is also apprehended that the rotary blade 4 may become unrotatable due to the attachment of scraps or iron rust produced in piping works to permanent magnet 5, in the case of using iron pipes in an upstream side flow passage.

Figure 2:
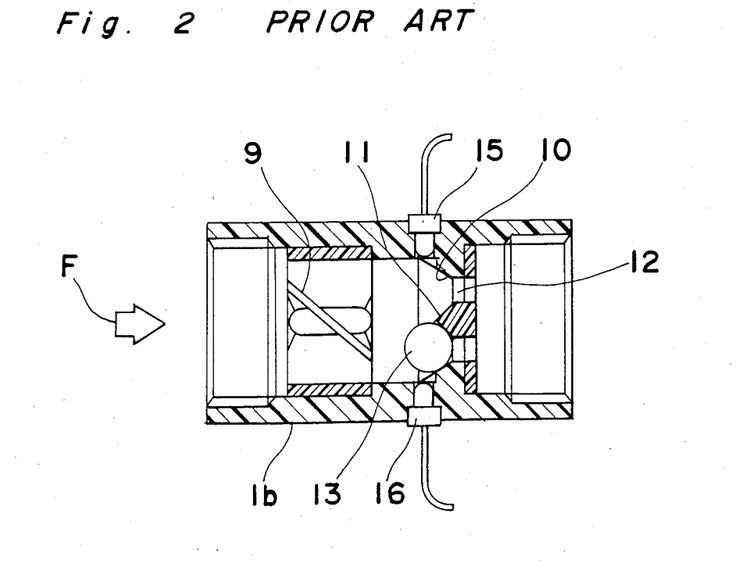

Another known example is such a flow rate detecting device as shown in FIG. 2, without any bearings in a flow passage.

In the conventional flow rate device of FIG. 2, there is provided a fixed blade 9 in the flow passage F, which turns a fluid into a rotary flow and an outflow path 12 at the downstream side thereof, through which the area of flow passage is annularly reduced in accordance with the construction of an inclined face 10 reducing said area inwards and an inclined face 11 protruding to upstream side at the center of the flow passage. The rotation of a spherical member 13 supported by said inclined faces 10 and 11 is detected by a light emitting element 15 and a light receiving element 16, provided in a fixed housing 1b. Accordingly, since the rotary speed corresponding to the flow rate can be obtained by the fixed blade 9, the spherical member 13 comes to rotate at the number of revolutions corresponding to the flow rate, and the light receiving element 16 produces pulse signals, the output of which is decreased every time the spherical member 13 intercepts the light from the light emitting element 15.

The above arrangement can avoid such an influence of foreign substances in a fluid, which is a cause of reduced signal response as aforesaid with reference to FIG. 1. However, the spherical member 13 receives a force caused by collision of a fluid and a force caused by a differential pressure upstream and downstream of the annular outflow path 12, in the direction to be pressed against the inclined faces 10 and 11, and moreover, a force toward the center of the rotary flow works on the inclined face 11 due to the decreasing pressure toward the central portion thereof and a centrifugal force works on the inclined face 10 by the rotation of said spherical member 13.

These forces cause a large frictional force against the rotary action, by pressing the spherical member 13 against a V-shaped groove formed by the inclined faces 10 and 11. Accordingly, the above known arrangement has such a problem that a detecting accuracy at a high rate cannot be obtained, since the proportional relation between the flow rate and the number of revolutions of the spherical member 13 is unstable, and thus, a high rotary speed cannot be achieved.

SUMMARY OF THE INVENTION

Accordingly, an essential object of the present invention is to provide an improved flow rate detecting device provided with a mechanical function in which, by reducing a force applied to a functioning portion of the device and acting to suppress the function thereof, the number of functions with respect to the flow rate is made sufficiently increased for the improvement of the flow rate detecting accuracy, while simultaneously, a proportional relation between the flow rate and the number of functions is stabilized over a wide range by preventing variations of functioning positions by the force arising from the fluid and applied to the functioning portion.

Another important object of the present invention is to provide a flow rate detecting device of the above described type which is free from deterioration in performance by wear of the mechanical functioning portion, or by fine sand particles, dust, metallic particles, etc. contained in fluids, with a consequent prolonged life.

In accomplishing these and other objects, according to one preferred embodiment of the present invention, there is provided a flow rate detecting device which includes a rotating means for converting a straightforward flow of a lufid into a rotary flow, and a spherical member provided downstram of the rotating means and adapted to rotate by the force of the rotary flow, in a circular track surface perpendicular to the straightforward direction, with the spherical member being supported by a spherical member receiver having a receiving face perpendicular to the straightforward direction of the fluid and outflow paths formed at the central and circumferential sides thereof, thereby to magnetically or optically detect the number of revolutions of said spherical member. In the above detecting device of the present invention, it is so arranged that the force in the straightforward direction acting on the spherical member is supported by the receiving face perpendicular thereto, while the force towards the central portion where the rotary flow passing through the central sides outflow path is formed, is offset by the force to the outward direction due to the fluid flow passing through the circumferential outflow path and centrifugal force of the spherical member itself. By the above arrangement of the present invention, the depressing force acting on the fixed portion contacted with the spherical member is reduced, and thus, deviation of the rotating position of the spherical member from the track contacting the flow passage inner surface can be prevented.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout several views of the accompanying drawings.

Figures 3A, 3B:
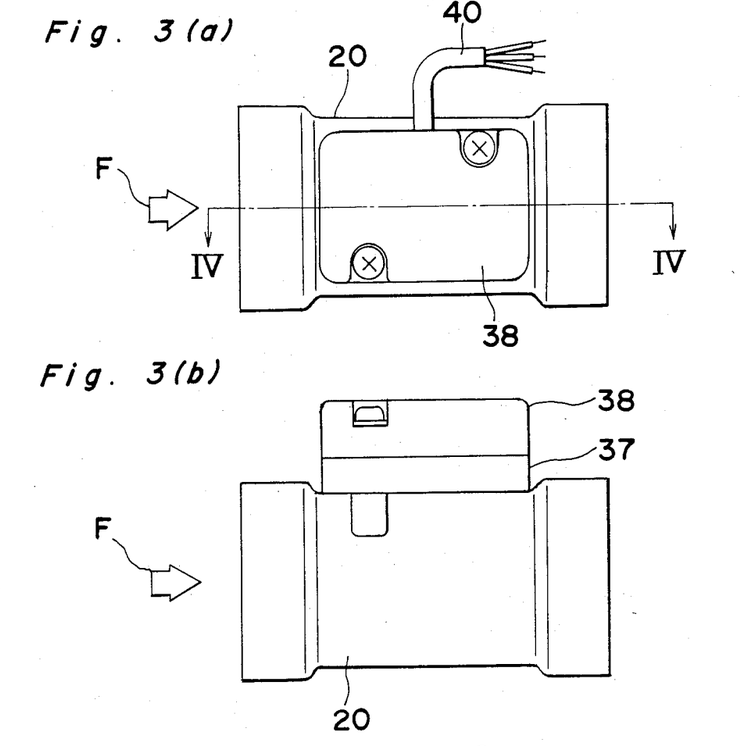
FIGS. 3(a) and 3(b) are a top plan view and a front view, respectively, showing an external appearance of a first embodiment of the present invention.
Figure 4:
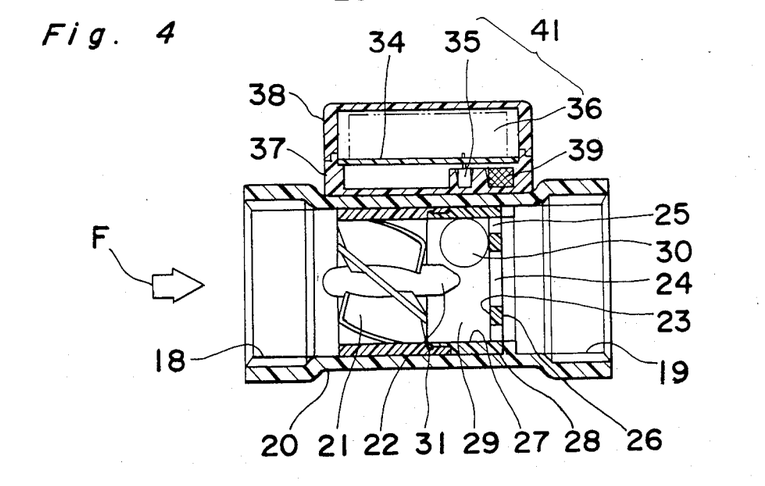
FIG. 4 is a cross-sectional view taken along the line IV—IV in FIG. 3(a)

Referring now to the drawings, there is shown, in FIGS. 3(a), 3(b) and 4, a flow rate detecting device according to one preferred embodiment of the present invention, which generally includes a housing 20 having an inlet joint 18 and an outlet joint 19 at its opposite ends and disposed along a flow passage F of a fluid, and a fixed blade 21 fitted in a cylindrical frame into a flow path of the housing 20 to completely fill the inner diameter thereof for converting the straightforward flow of the fluid into a rotary flow, with a central portion of said fixed blade 21 forming a projection 22 pointed at its forward end at a downstream side thereof. There are also arranged a spherical member receiver 26 having an annular receiving face 23 perpendicular to the straightforward direction of a flow, central outflow path 24 in the central side of said receiving face 23 and a circumferential outflow path 25 in the circumferential side thereof downstream of the projection 22.

The fixed blade 21 and the spherical member receiver 26 are arranged at a regular interval for the provision of an intermediate flow path member 28 having a cylindrical inner face 27 and a spherical member 30 is provided in a space 29 surrounded by the fixed blade 21, the spherical member receiver 26 and the intermediate flow path member 28. The constituent parts as described above are all in contact with the fluid directly. The housing 20, intermediate flow path member 28 and the cylindrical frame for the blade 21 define the flow passage F therethrough.

Figure 6A:
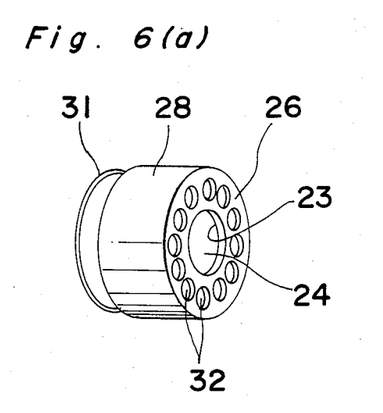
FIGS. 6(a) and 6(b) are perspective views of different embodiments of a main portion of said device.
Figure 6B:
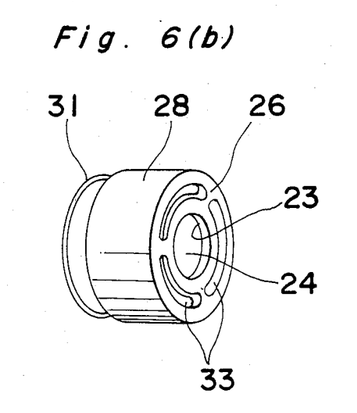

In the first embodiment of FIG. 4, the spherical member receiver 26 and the intermediate flow path member 28 which are formed into a one-piece construction are inserted into housing 20 of a circumferential portion of the fixed blade 21 and fixedly connected thereto by a claw 31. A plurality of circular openings 32 as illustrated in FIG. 6(a), a plurality of arcuate openings 33 as illustrated in FIG. 6(b) or the like may be employed as the configuration of the circumferential outflow path 25.

Subsequently, on the housing 20 outside the intermediate flow path member 28 there is provided a magnetic reluctance element 35 whichis soldered on the undersurface of a printed board 34, and a circuit portion 36 is formed on the upper surface of said printed board 34, which produces pulse signals after processing reluctance change singals from said magnetic reluctance element 35. The electronic circuit as mentioned above is covered with a lower case 37 and an upper case 38, and furthermore, the lower case 37 is provided with a permanent magnet 39 which forms a counterpart of said magnetic reluctance element 35, and lead wires 40 are led out between a pair of said cases.

A revolution detecting means 41 of the spherical member 30 comprises the magnetic reluctance element 35, the circuit portion 36 and the permanent magnet 39, and in this case, the spherical member 30 is made of a ferromagnetic material.

The function of the first embodiment of FIG. 4 as described so far will be explained hereinafter. A fluid entering a rightward direction as a straightforward flow is turned into a fluid flow rotating clockwise or counterclockwise by the fixed blade 21, and the spherical member 30 affected by said rotary flow is subjected to a rotary motion having an orbit perpendicular to the straightforward direction, while keeping in contact with the receiving face 23 of the spherical member receiver 26 and the cylindrical inner face 27 of the intermediate flow path member 28. At this time, the spherical member 30 receives a force directed radially inward, that is, centrally of the rotary flow or toward the low pressure portion thereof to reduce a rotating diameter, as well as a force pressing the spherical member 30 against the receiving face 23 in the straightforward direction. The former is, however, concelled under the condition of being smaller than the total or net force toward the radially outward direction by the flow passing through the circumferential outflow path 25 and a centrifugal force of the spherical member 30 itself.

It is, therefore, unnecessary to provide the inclined face 11 at the central portion, which is indispensable for the conventional arrangement as shown in FIG. 2. Furthermore, the construction of the present invention does not include such a problem that a force perpendicular to the face on which friction occurs, becomes bigger when the force in the straightforward direction is received on an inclined face, since the receiving face 23 is flat and not inclined.

In addition, the spherical member 30 is pressed against the receiving face 23 only by a force caused through a collision of the fluid and there is not such a force caused by a differential pressure upstream and downstream of the an outflow path 12 as shown in the conventional arrangement FIG. 2, the consequently, a force received on the receiving face 23 is decreased.

A force working on the cylindrical inner face 27 of the intermediate flow path member 28 in the radial direction is also decreased, since that is a difference between a force in the central direction (radially inward) and a force in the outward direction (radially outward) as aforementioned.

Such being the case, it has been brought to realization to get an increased number of revolutions of the spherical member 30 in comparison with that of the conventional arrangement by the same flow rate of the fluid, since the frictional force which restrains the rotary motion is decreased owing to such construction that the physical force between the spherical member 30 and the fixed portion for supporting the spherical member 30, can be decreased.

Stability of the proportional relation between the flow rate and the number of revolutions can be obtained without an alteration of a rotating orbit of the spherical member 30, since it is possible to establish a relation between said forces, on which the spherical member 30 can keep in contact with the cylindrical inner face 27 of the intermediate flow path member 28. Thus, an improvement of detecting accuracy for the flow rate detecting device can be accomplished.

Figure 5:
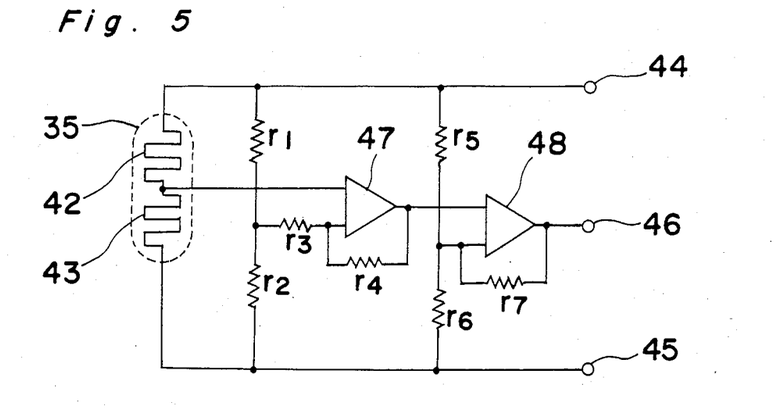
FIG. 5 is a cricuit diagram of the flow rate detecting device.

Referring also to FIGS. 4 and 5, the revolution detecting means 41 will be explained hereinafter. The magnetic reluctance element 35, comprising a pair of resistors 42 and 43, is placed in a magnetic field by the permanent magnet 39, and a magnetic flux distribution passing through the magnetic reluctance element 35 changes between the condition in which the spherical member 30 of a ferromagnetic material is apart from the magnetic reluctance element 35 and the condition in which the former is adjacent to the latter as shown in FIG. 4.

Since the resistors 42 and 43 are so arranged that the magnetic reluctance element 35 is affected in the magnetic field perpendicular to the printed board 34, the ratio of resistors 42 and 43 changes in accordance with the distance from the spherical member 30.

As shown in FIG. 5, the resistors 42 and 43 of the magnetic reluctance element 35 are couped to resistors r1 and r2 connected in series between lines leading to terminals 44 and 45 to constitute a wheatstone bridge circuit, with a junction between the resistors 42 and 43 being connected to one input of an operational amplifier 47, and a junction between the resistors r1 and r2 being connected to the other input of said amplifier 47 thrugh a resistor r3, while a resistor r4 is connected between the other input terminal and an output of said amplifier 47. Resistors r5 and r6 connected in series are further connected between the lines leading to the terminals 44 and 45, and the output of the amplifier 47 is connected to one input of a comparator 48, with a junction between the resistors r5 and r6 being connected to the other input of said comparator 48, while a resistor r7 is further connected to the other input and an output of said comparator 48 which is connected to a terminal 46.

Accordingly, the central electric potential between the resistors 42 and 43 is applied to the one input terminal of the operational amplifier 47, and the central electric potential between the resistors r1 and r2 is applied to the other input terminal thereof through the resistor r3, to which the output of the operational amplifier 47 is fed back through the resistor r4. Subsequently, a potential difference generated once a revolution of the spherical member is applied to one terminal of the comparator 48 after the amplification by the operational amplifier 47 in the ratio of r3 to r4. A central electric potential between the resistor r5 connected to the terminal 44 and the resistor r6 connected to the terminal 45 is also applied to the other terminal of the comparator 48, to which the output thereof is fed back through a resistor r7.

When the output voltage of the operational amplifier 47 goes up and down to the predetermined value which depends upon the resistors r5, r6 and r7, actions of ON and OFF are put into operation in the compartor 48. Therefore, provided that a group of resistor values are well established with voltage applied to terminals 44 and 45, the pulse voltage synchronous to the rotation of the spherical member 30 occurs between terminals 45 and 46.

Figure 7:
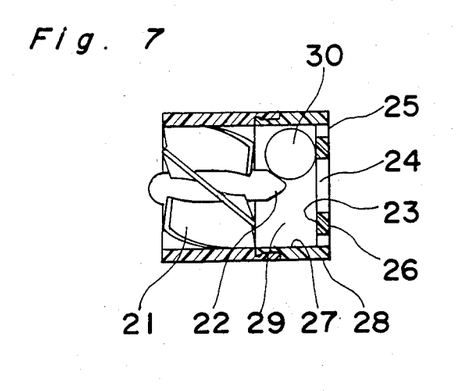
FIG. 7 is a cross-sectional view, showing a rotating means and a positional relation between the spherical member and its receiver of said device.

FIG. 7 shows merely the fixed blade 21, the spherical member receiver 26, the intermediate flow path member 28 and the spherical member 30. Although the diameter of the central outflow path is larger than that of the spherical member 30, the distance between the protruding portion 22 and the receiving face 23 of the spherical member receiver 26 is made smaller than the diameter of the spherical member e0 owing to the provision of said protruding portion 22 toward the downstream side at the central downstream end of the fixed blade 21. Consequently, it is not to be supposed that the spherical member 30 may flow out of this device, even if the spherical member 30 moves freely.

Since the above is obtained by devising the configuration of the protruding portion 22 of the fixed blade 21, the construction is simple and has such an effect as to reduce a pressure drop, as compared with the case that the diameter of the central outflow path 24 is reduced or a crosspiece is provided, in order to prevent the spherical member 30 from flowing out.

As it is necessary to make the spherical member 30 of the ferromagnetic material so that the spherical member 30 can be detected by the magnetic reluctance element 35 which is shown in the embodiment in FIG. 4, a plurality of embodiments for the spherical member 30 will be explained hereinafter, with reference to FIGS. 8(a) to 8(h). There is a cross relation between the weight of the spherical member 30 and the minimum value of the flow rate (hereinafter called a starting flow rate) at which the spherical member 30 starts to rotate, and the starting flow rate goes down as the spherical member 30 becomes lighter.

A magnification of the detecting range requires a tendency toward light weight, though a metallic spherical member of the ferromagnetic material can be used for a large flow rate of the fluid.

Figure 8A:
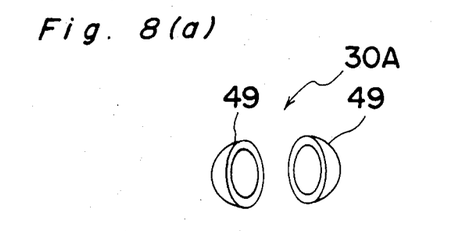
FIGS. 8(a) through 8(h) are exploded perspective views and cross-sectional views showing examples of the spherical members which may be employed in said device.
Figure 8B:
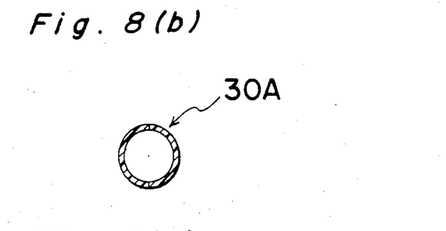
Figure 8C:
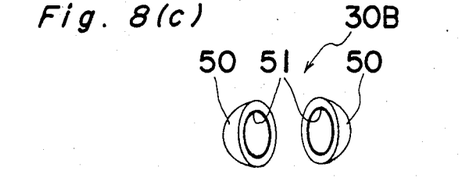
Figure 8D:
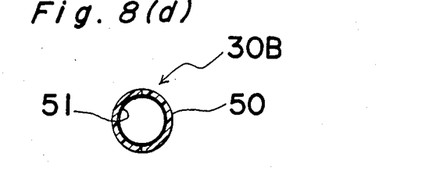

FIGS. 8(a) and 8(b) show a preferred embodiment of the spherical member 30, in which hollow hemispherical members 49 are formed of ferromagnetic metallic material or resin mixed with ferromagnetic powder and formed into a spherical member 30A through welding or ultrasonic deposition after facing each other. In FIGS. 8(a) and 8(d), surface treating films 51 are formed on the inner surfaces of hollow hemispherical members 50 made of resin through gilding or vaporization of the ferromagnetic material and a hollow spherical member 30B is formed through ultrasonic deposition.

Figure 8E:
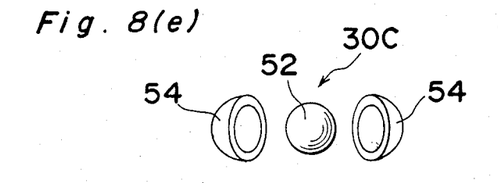
Figure 8F:
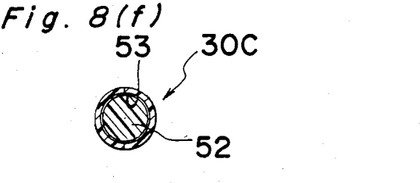
Figure 8G:
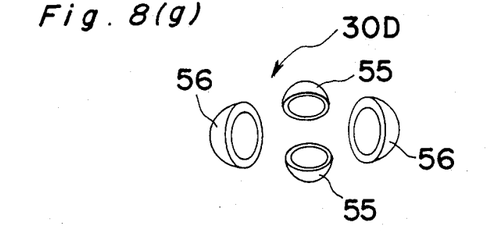
Figure 8H:
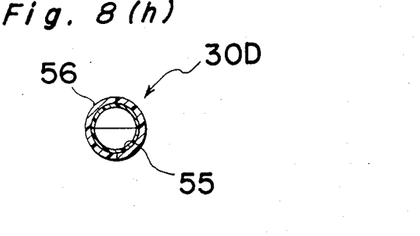

FIGS. 8(e) and 8(f) show another modification in which a surface treating film 53 is formed of the ferromagnetic material on the outer surface of a resinous spherical member 52 and the whole thereof is covered with hollow hemispherical members 54 made of resin, before ultrasonic deposition. In FIGS. 8(g) and 8(h), hollow hemispherical members 55, which are made of resin mixed with ferromagnetic powder, are covered with hollow hemispherical members 56 made of resin, and a hollow spherical member 30D is formed through ultrasonic deposition.

In either case as described above, it is possible to make the spherical member lighter than the metallic one and the decreasing starting flow rate is attained, along with the aforementioned construction with less frictional force.

In case there is a possibility of corrosion on the ferromagnetic material due to long-term existence in the fluid, the constructions shown in FIGS. 8(a), 8(b), 8(g) and 8(h) are fit for use, in which the spherical member 30 is formed of resin mixed with powder of oxidized magnetic material such as ferrite. It is also preferable to cover the outer surface with resinous material having a resistance to wear and a low friction coefficient as shown in FIGS. 8(g) and 8(h), so as to decrease wear by rotation.

Figure 9A:
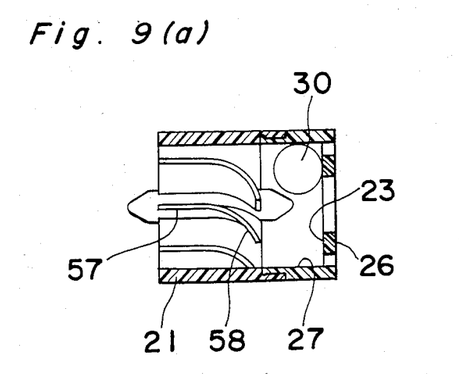
FIGS. 9(a) and 9(b) are cross-sectional views showing the rotating means and the spherical member receiver of a second embodiment of the present invention.

Another embodiment of the present invention associated with the fixed blade 21 and the spherical member receiver 26 will be explained with reference to FIGS. 9(a) and 9(b). FIG. 9(a) shows a modification relative to the blade configuration of the fixed blade 21, in which the upstream side terminal 57 is rectilinear and parallel to the flow passage, and the blade gradually turns to be an arcuate curved blade 58 as it draws toward the downstream side.

Figure 9B:
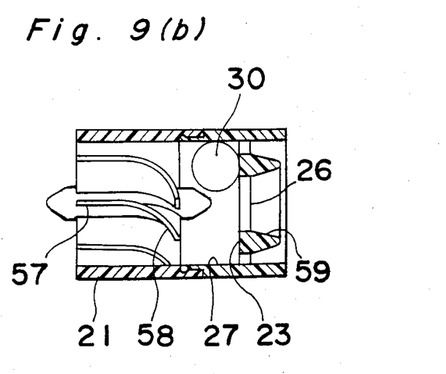

FIG. 9(b) also shows another modification, in which the downstream side of the receiving face 23 of the spherical member receiver 26 is annular in shape, having an end portion 59 tapering down in its longitudinal section toward the downstream side, i.e., said end portion having a decreasing outer diameter and an increasing inner diameter toward the downstream side.

In comparison with the embodiment of FIG. 4, passages resistance can be decreased by these constructions, which are free from a collision of the fixed portion against the fluid and a sudden expansion of the passage.

Figure 10:
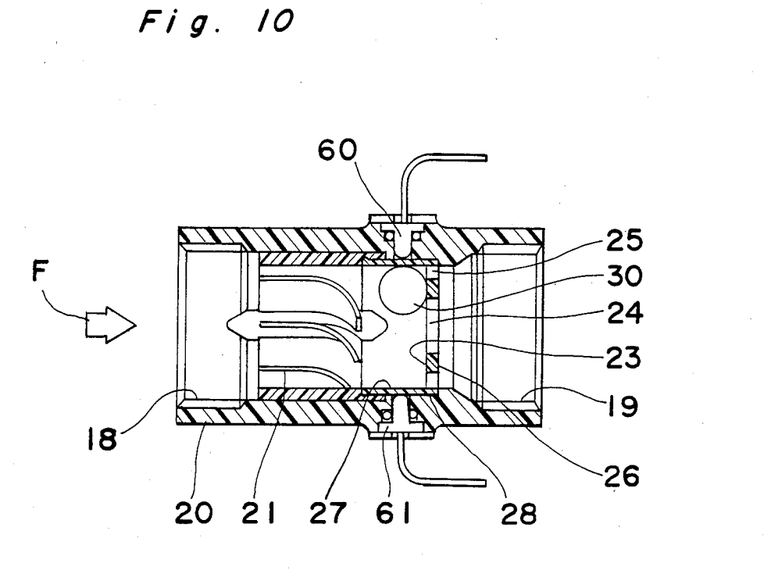
FIG. 10 is a cross-sectional view of the flow rate detecting device according to a further embodiment of the present invention.

Referring now to FIG. 10, a further embodiment of the present invention associated with the revolution detecting means 41 of the spherical member 30 will be described hereinafter.

The intermediate flow path member 28, which is formed of transparent resin or glass, is fixed to the housing 20 so that the light emitting element 60 and the light receiving element 61 are facing each other in a radial direction on the rotating orbit of the spherical member 30. Since the spherical member 30 rotates on the orbital face, including an optical axis of said both elements, the light receiving element 61 sends ON-OFF output signals according to whether the spherical member 30 intercepts the light or not.

The spherical member 30 rotates, keeping in contact with the cylindrical inner face 27 of the intermediate flow path member 28 at all times, as aforementioned.

In the conventional example in FIG. 2, since the spherical member 13 rotates, keeping in constant contact with the inclined faces 10 and 11, the optical axis of the light emitting element 15 and the light receiving element 16 does not coincide with the contact surface. Accordingly, it is apprehended that said detection becomes impossible owing to an attachment of such foreign substances on the face including the optical axis, as dust in the fluid or scale formed by a deposit of calcium constituent after separation out of water.

With regard to the embodiment in FIG. 10, the impossibility of said detection caused by the decrease of transparency does not occur, since the cylindrical inner face on the optical axis is cleaned through the rotation of the spherical member 30 which keeps in constant contact with said inner face.

In addition, the above construction has the effect of facilitating accurate receipt of signals in a circuit due to the large change in the amount of light received by the light receiving element 61 and reduced noise component in the output signal, both of which are caused by complete interception of the optical axis by the spherical member 30.

As is clearly seen from the foregoing description for each of the embodiments, it goes without saying that the present invention is not subject to the influence of foreign substances mixed therein on account of having neither bearings nor permanent magnetic material in the fluid, since the central outflow path 24 and the circumferential outflow path 25 are provided at central and circumferental sides of the spherical member receiver 26, respectively. The flow rate detecting accuracy is improved over a wide range of flow rate, by reason of an unchangeable rotating orbit and less frictional force on the contact surfaces between the spherical member 30 and fixed surfaces.

Furthermore, the rotation of the spherical member 30 keeping in constant contact with the cylindrical inner face 27 of the intermediate flow path member 28, has the same meaning as an unchangeable detecting sensitivity in case of detecting magnetically as shown in the embodiment of FIG. 4, and which facilitates the design of the circuit portion 36. Moreover, since the less the frictional force is, the more easily the spherical member can rotate, the invention is effective to decrease the starting flow rate, and a long lifetime can be obtained due to less wear in long-term use.

The flow rate detecting device of the present invention can be applied to an automatic stop apparatus for feed water, by which water supply is cut off upon arrival at the predetermined integrated flow amount, in combination with a solenoid valve provided separately in the water supplying apparatus. In an instantaneous hot water supplying apparatus, the present invention can be also applied to a feedforward control, in which the heating rate is adjusted in compliance with variations of supplied water rate, before the detection of variations of hot water temperature. Further, upon detection of an instantaneous flow rate at each of fuel supplying passage and combustion air supplying passage for a burning apparatus, by means of the flow rate detecting device of the present invention provided on each passage, the ratio of air consumption to fuel consumption can be controlled to keep the optimum combustion condition.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A flow rate detecting device, comprising:
   a conduit having a flow passage defined therein for directing a fluid flow to be detected, in a straight-forward direction along said passage;

fluid flow rotating means immovably disposed in said passage, for converting the fluid flow in said passage from a straightforward flow into a rotary flow in said passage;

a spherical member receiver disposed in said passage spaced from said fluid flow rotating means in a downstream direction with respect thereto, said receiver having a receiving face in said passage perpendicular to said straightforward direction; said conduit including an intermediate flow path member having an inner face of circular cross section, extending in said straightforward direction between said fluid flow rotating means and said spherical member receiver;

a spherical member freely movably disposed in a space bounded by said fluid flow rotating means, said spherical member receiver and said inner face; and a revolution detecting means for detecting a number of revolutions of said spherical member about the center axis of said inner face;

said fluid flow rotating means including a fixed blade having a protruding portion at a downstream end thereof, said protruding portion extending toward said spherical member receiver in alignment with said center axis of said inner face and terminating at a free end thereof upstream of the center of said spherical member, said free end being located a distance from said receiving face less than the diameter of said spherical member, said spherical member receiver having openings therein radially inward and outward of said receiving face respectively defining central and circumferential outflow paths directing the fluid flow therethrough.

2. A flow rate detecting device as claimed in claim 1, wherein said intermediate flow path member is transparent and said revolution detecting means includes a light emitting element and a light receiving element spaced from said light emitting element, both located on a radially outer circumferential surface of said intermediate flow path member, positioned so that during each revolution of said spherical member along said inner face of said intermediate flow path member, said spherical member passes twice directly between said light emitting element and said light receiving element.

3. A flow rate detecting device as claimed in claim 1, wherein said circumferential outflow path includes a plurality of arcuate openings.

4. A flow rate detecting device as claimed in claim 1, wherein said spherical member receivier includes an annular end portion between said central and circumferential outflow paths, said annular end portion having inner and outer diameters which respectively increase and decrease in the downstream direction, downstream of said receiving face.

5. A flow rate detecting device as claimed in claim 1, wherein said revolution detecting means includes a magnetic element provided outside of said intermediate flow path member, said spherical member including a hollow core made of a quantity of resin mixed with magnetic particles, and a covering layer of resin applied onto an outer surface of said core.

6. A flow rate detecting device as claimed in claim 1, wherein said central outflow path has a diameter larger than the diameter of said spherical member.

7. A flow rate detecting device as claimed in claim 1, wherein said circumferential outflow path includes a plurality of circular openings.

* * * * *